June 16, 1959 — W. R. MENGEL — 2,890,517
MECHANISM FOR SECURING ROLL TO SHAFT
Filed June 27, 1958
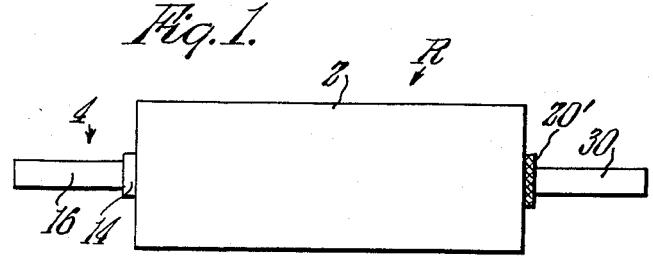
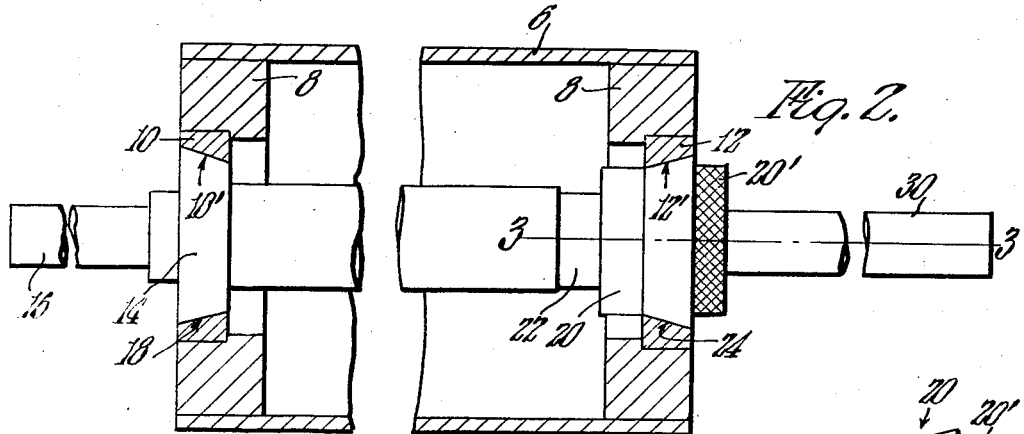
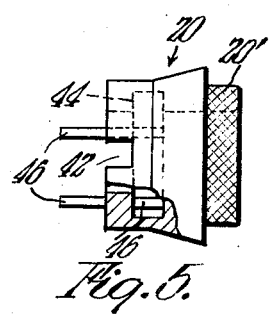
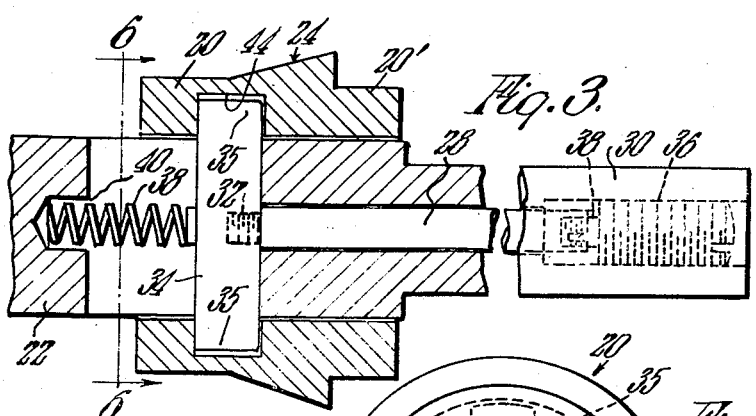
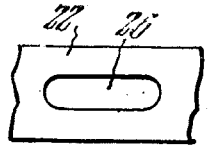
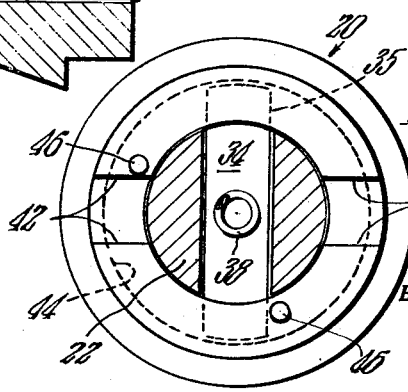
INVENTOR.
William R. Mengel.
BY Poor Poor attys.

2,890,517

MECHANISM FOR SECURING ROLL TO SHAFT

William R. Mengel, Northampton, Mass., assignor to Magnat Machinery & Pattern Corp., Leeds, Mass., a corporation Application June 27, 1958, Serial No. 744,980

6 Claims. (Cl. 29—129)

This invention relates to improvements in roll construction and is directed more particularly to roll construction wherein a roll body is adjustable about the axis of a shaft or arbor thereof.

The principal object of the invention is directed to the provision of a roll construction having a supporting shaft or arbor, and a roll body which is adjustable about said shaft in combination with locking means for locking the body to the shaft in various adjusted positions.

The novel features of the invention are adapted for various uses but for purposes of disclosure, and not by way of limitation, the invention will be described in connection with such rolls as are employed in printing apparatus and machines for various printing operations.

Such rolls have peripheral surfaces prepared in various ways, or have printing elements associated therewith for various printing processes in printing apparatus. The roll shafts are usually operatively connected to cooperating elements by various means such as gearing or the like.

It is desired and necessary that the roll be adjusted circumferentially relative to the shaft for registering the printed matter or the like. Such presents difficulties and is objectionable due to the connection of the roll shaft with cooperating components.

According to the novel features of this invention, the roll body may be rotated through any desired angle relative to its shaft, while the roll and shaft are in the printing machine with the shaft connected to other operating components. The adjustment is accomplished without disturbing the shaft or cooperating components.

As a special feature of the invention, novel means is provided to lock simultaneously opposite ends of the roll body to the shaft in any desired position of adjustment. The locking means is readily and easily operated with the result that down time of the printing machine is negligible, and adjustments may be made within very fine limits for registration and other purposes.

The novel locking means is positive in action and obviates the possibility of relative movements of the roll body and shaft which would negate such fine adjustments as are possible to attain herewith.

It will be understood that the invention is generally adaptable where it is desired to provide adjustability of a roll about its shaft, whether in connection with printing or other apparatus, and various changes and modifications may be made within the scope and spirit of the invention to adapt it to various uses.

In the drawings:

Fig. 1 is an elevational view of roll construction embodying the novel features of the invention;

Fig. 2 is a longitudinal sectional elevational view through the roll construction shown in Fig. 1;

Fig. 3 is a sectional view through the end of the roll shaft or arbor on the line 3—3 of Fig. 2;

Fig. 4 is a partial plan view of an end of the roll shaft;

Fig. 5 is a plan view of the movable wedge member of the roll body and shaft locking mechanism; and Fig. 6 is a sectional elevational view on the line 6—6 of Fig. 3.

Referring now to the drawings more in detail, the novel features of the invention will be fully described.

The roll R of the invention, in a general way, includes a roll body 2, a shaft or arbor 4, and means for locking the body in angular positions of adjustment on the shaft.

The roll body 2, for purposes of disclosure, includes a tubular component 6, and end headers 8 secured together in any well known manner. A printing element may be secured around the component 6, or it may be prepared in various ways for desired printing operations, but forms no part of the present invention.

Socket members 10 and 12 are secured in the headers 8, in any well known manner, as by a press fit or the like. Said socket members are formed with tapering seats 10' and 12' which converge towards one another. The seats of course may be formed directly in the roll body, or headers, if desired.

The members 10 and 12 will preferably be metal hardened in some well known manner, and the seats thereof will be ground to provide a smooth hard surface.

A member 14, which for convenience will be called a wedge, is suitably secured to one end 16 of the shaft 4, and will preferably be of hardened metal with a peripheral surface 18 ground so to be complemental to the seat 10' of the socket member 10.

A second wedge member 20 is slidable and rotatable on a portion 22 of the shaft 4, and is removable axially therefrom. Said member will have a hardened and ground peripheral surface 24 complemental to the seat 12' of the member 12.

The shaft portion 22 is provided with an elongated slot 26 therein, as shown in Fig. 4.

A pressure rod 28 is freely slidable in the shaft portion 22, and in the opposite end 30 of the shaft, and has an inner end 32 in threaded engagement with a bar 34 slidably disposed in the slot 26 of the shaft portion 22.

A pressure screw 36 in threaded engagement with the outer end of the shaft portion 30 has a pilot 38 disposed in the outer end of the rod 28. As the screw 36 is turned in one direction, the rod 28 is moved inwardly to press on and move the bar 34 inwardly against a compression spring 38 having an end seated in a socket 40 of the shaft part 22.

As the screw 36 is turned in an opposite direction, the spring 38 urges the bar 34, and rod 28 outwardly of the shaft.

The member 20 is provided on the inner end thereof with diametrically opposite notches 42, in which the ends 35 of the bar 34 are receivable. The notches and bar ends are engaged as the member 20 slides inwardly, and are disengaged as said member slides outwardly on the shaft.

Said member 20 is also provided with an annular groove 44 interiorly thereof in which the ends 35 of the bar 34 are receivable, and is arranged so that the member 20 may be turned in opposite directions with said ends 35 in the groove thereof.

The notches 42 are related to the groove 44 so that, with the ends 35 of the bar 34 in said notches, the member 20 may be moved inwardly to position said ends 35 in the groove 44, and then the member 20 may be turned so that the ends 35 are disposed rearwardly of the innermost side of the groove 44, see Fig. 3.

With the ends 35 of the bar 34 in the groove 44 of member 20, as in Fig. 3, and out of alignment with the notches 42, the screw 36 is turned in one direction so as to force the rod 38 and thereby the bar 34 inwardly. The bar ends 35 act on the inner side of the groove 44 of member 20 so that the peripheral surface 24 of said member is firmly seated in the seating surface 12' of socket member 12, and of course so as to bring the surfaces 18 and 10' at the opposite end of the structure into seated relationship, locking the roll body and shaft against relative radial movements.

Thus, by turning the screw 36 in one direction, the seating surfaces are engaged to lock the roll body and shaft against relative movements. By turning the screw in an opposite direction, the spring 38 moves the member 20 outwardly to release the seating engagement of the parts.

With the member 20 moved outwardly for unseating of the parts, the said member is turned so that the notches 42 and bar ends 35 are aligned, and then the member 20 is free for withdrawal from off the shaft.

Various means may be employed for manipulating the member 20. However, for purposes of disclosure, a manually engageable knurled skirt 20' is provided thereon, as shown.

Stop means in the form of pins 46 are provided on the member 20 which extend through the groove 44 thereof. Said pins are adapted to abut the ends 35 of the bar, and are located to limit turning movements of member 20 on the shaft, so that the notches 42 thereof may be aligned with the ends 35 of the bar 34 or disposed out of alignment.

With the roll structure in a machine and the roll shaft connected to other components, it is an easy matter, without disconnecting the roll shaft, to back off on the screw 36 in one direction to release the seated components. Thereby the roll body may be turned in one direction or the other relative to the shaft for registration or other purposes. To lock the roll body to the shaft, the screw 36 is turned in an opposite direction.

The construction is simple in form as well as efficient in operation to the end that the roll body and shaft may be readily and easily locked or unlocked for adjusting purposes without disturbing the shaft which may be operatively connected to cooperating components.

Various changes and modifications may be made in the form of the invention, shown for purposes of disclosure in the form at present preferred, to adapt the invention to various uses. It is desired to be limited, if at all, by the appended claims, rather than the foregoing disclosure.

I claim:

1. The combination with a roll body and shaft therefor of mechanism to lock said body and shaft against relative movements comprising, socket members in opposite ends of said body having conical sockets converging towards one another, a first wedge member for wedging in the socket at one end of said body fixed to one end of said shaft, a second wedge member on said other end of said shaft for wedging in said socket at said other end of the body, a bar slidable in said other end of the shaft having ends disposed outside said shaft, said second wedge member being rotatable and slidable on said shaft and provided with an internal annular groove and notches in communication therewith for passage of said bar ends into and out of said groove, and means for urging said bar inwardly with the ends thereof in the groove of said second wedge member whereby said second wedge member is moved towards said first wedge member to seat said wedge members in their respective sockets and lock said body and shaft against relative movements.

2. The combination with a roll body and shaft therefor of mechanism to lock said body and shaft against relative movements comprising, socket members in opposite ends of said body having conical sockets converging towards one another, a first wedge fixed to one end of said shaft for wedging in the socket at one end of said body, a second wedge on the other end of said shaft for wedging in the socket at the other end of said body, a bar slidable longitudinally in said other end of said shaft having opposite ends, said second wedge having an internal groove for the ends of said bar and notches on the inner end thereof in communication with said groove to receive said ends, said second wedge being slidable on said other end of said shaft whereby the ends of the bar in said notches may enter said groove and being turnable on said shaft whereby said bar ends may be disposed in said groove and out of alignment with said notches, and means acting on to move said bar inwardly to move said second wedge towards said first wedge whereby said wedges are seated simultaneously in their respective sockets to lock said body and shaft against relative movement.

3. In a roll construction which consists in a roll body and a shaft extending therethrough, the improvement in means for releasably locking said body and shaft against relative movement comprising, said body provided on opposite ends thereof with sockets having sides converging towards one another, a first wedge fixed to said shaft at one end thereof for releasably wedging in the socket at one end of said body, a second wedge on the other end of said shaft for releasably wedging in the socket at the other end of said body, the said other end of said shaft provided with a longitudinal slot therethrough inwardly of the outer extremity of said other end, a rod slidable in said other end of the shaft having a transverse bar on the inner end thereof disposed in said slot which is provided with opposite ends extending outwardly of said slot and shaft, said second wedge provided with an internal annular groove inwardly of the inner end thereof for receiving the said opposite ends of said bar and with notches through said inner end communicating with said groove, said second wedge being slidable on said other end of the shaft inwardly and outwardly in wedging and non-wedging directions for the passage of the opposite ends of the bar into and out of said groove and being rotatable on the said other end of the shaft for positioning the opposite ends of the bar within said groove and out of register with said notches, and means for exerting inward pressure to said rod whereby with the opposite ends of the bar within said groove said second wedge is urged into wedging relation with its socket and said first wedge is urged into wedging relation with its socket.

4. The improvement in means for releasably locking a roll body and shaft against movement as set forth in claim 3 wherein the means for exerting pressure to said rod includes a member in screw threaded engagement with the other end of said shaft engageable with the outer end of said rod.

5. The improvement in means for releasably locking a roll body and shaft against movement as set forth in claim 3 wherein means is provided for rotating said second wedge and includes a manually engageable portion on the outer end of said wedge.

6. The improvement in means for releasably locking a roll body and shaft against movement set forth in claim 3 wherein means is provided for limiting rotation of second wedge to a position wherein the notches of said second wedge are in or out of register with opposite ends of said bar and includes a pair of pins disposed in the groove of said second wedge alternately engageable with opposite sides of opposite ends of said bar as said second wedge is rotated in opposite directions.

References Cited in the file of this patent

UNITED STATES PATENTS

| | | |
|---|---|---|
| 1,891,405 | Erickson | Dec. 20, 1932 |
| 2,178,491 | Palotee | Oct. 31, 1939 |